United States Patent
Ling et al.

(10) Patent No.: US 11,055,443 B1
(45) Date of Patent: Jul. 6, 2021

(54) MODULE AND METHOD FOR DETECTING MALICIOUS ACTIVITIES IN A STORAGE DEVICE

(71) Applicant: FLEXXON PTE. LTD., Singapore (SG)

(72) Inventors: Chan Mei Ling, Singapore (SG); Nizar Bouguerra, Singapore (SG)

(73) Assignee: FLEXXON PTE. LTD., Singapore (SG)

( * ) Notice: Subject to any disclaimer, the term of this patent is extended or adjusted under 35 U.S.C. 154(b) by 0 days.

(21) Appl. No.: 17/119,348

(22) Filed: Dec. 11, 2020

(30) Foreign Application Priority Data

Oct. 1, 2020 (SG) .......................... 10202009754Q (51) Int. Cl.
  *G06F 21/78* (2013.01)
  *G06F 21/57* (2013.01)
  *G06N 3/04* (2006.01)
  *G06K 9/62* (2006.01)
  *G06F 21/56* (2013.01)

(52) U.S. Cl.
  CPC ............ *G06F 21/78* (2013.01); *G06F 21/566* (2013.01); *G06F 21/572* (2013.01); *G06K 9/6256* (2013.01); *G06N 3/04* (2013.01)

(58) Field of Classification Search
  CPC ...... G06F 21/78; G06F 21/572; G06F 21/566; G06N 3/04; G06K 9/6256
  See application file for complete search history.

(56) References Cited

U.S. PATENT DOCUMENTS

| | | | |
|---|---|---|---|
| 10,198,595 B2 * | 2/2019 | Lancaster | H04L 63/10 |
| 2007/0294768 A1 | 12/2007 | Moskovitch et al. | |
| 2012/0255010 A1 * | 10/2012 | Sallam | H04L 63/1408 726/24 |
| 2013/0291070 A1 * | 10/2013 | Triantafillou | G06F 21/606 726/4 |
| 2013/0291110 A1 * | 10/2013 | Thadikaran | G06F 11/3476 726/23 |
| 2020/0036750 A1 | 1/2020 | Bahnsen et al. | |

FOREIGN PATENT DOCUMENTS

| | | |
|---|---|---|
| CN | 102737186 A | 10/2012 |
| CN | 103853979 A | 6/2014 |
| CN | 107742079 A | 2/2018 |

OTHER PUBLICATIONS

Allowed claims of Singapore Application No. 10202009754Q.
Notice of Eligibility for Grant for Singapore Application No. 10202009754Q dated Nov. 30, 2020.
Examination Report for Singapore Application No. 10202009754Q dated Nov. 24, 2020.
Search Report for Singapore Application No. 10202009754Q dated Nov. 24, 2020.

* cited by examiner

*Primary Examiner* — Paul E Callahan
(74) *Attorney, Agent, or Firm* — Burns & Levinson, LLP; Steven M. Mills (57) ABSTRACT

This document describes a module and method for detecting malicious activities in a storage device whereby the module is provided within a controller of the storage device. The module is configured to monitor, using a trained neural network, appropriate logical block addresses (LBAs) of the file system of the storage device that contain sensitive data or information for malicious activities.

18 Claims, 3 Drawing Sheets

FIGURE 5 ive neural network to detect malicious activities in a storage device.

MODULE AND METHOD FOR DETECTING MALICIOUS ACTIVITIES IN A STORAGE DEVICE

CROSS-REFERENCE TO RELATED APPLICATIONS

This application claims priority to and benefit of Singapore Patent Application No. 10202009754Q, filed Oct. 1, 2020, entitled MODULE AND METHOD FOR DETECTING MALICIOUS ACTIVITIES IN A STORAGE DEVICE, the entire contents of which are incorporated herein by reference for all purposes.

FIELD OF THE INVENTION

This invention relates to a module and method for detecting malicious activities in a storage device whereby the module is provided within a controller of the storage device. The module is configured to monitor, using a trained neural network, appropriate logical block addresses (LBAs) of the file system of the storage device that contain sensitive data or information for malicious activities.

BACKGROUND

Storage devices typically comprise of solid state devices (SSDs), hard disk drives (HDDs), optical drives or a magnetic disc drives. Regardless of the type of storage device, these devices are typically addressed linearly by their logical block addresses (LBAs). For HDDs, optical drives or magnetic disk drives, LBAs specify the location of specific blocks of data stored within the drive. As an example, LBA 0 would refer to the first sector on the first track accessible by the first head in the disc drive as such, when LBA 0 is accessed by a host device, the content contained at LBA 0 would be provided to the host device.

However, unlike the disk drives described above, SSDs comprise non-volatile memories that are electrically erasable and re-programmable and as such, would not have tracks or heads as referred to in the logical block addressing system. Hence, SSDs have to make use of a flash translation layer (FTL) as provided within the SSD's flash memory controller to map a host device's file system logical block addresses to the physical addresses of the flash memory (logical-to-physical mapping). In other words, the host device will still utilize existing LBA addressing methodologies to address the SSD for read/write/overwrite operations. These commands from the host device will be intercepted by the FTL and the FTL will maintain a map of the relationship between LBAs to physical block addresses (PBAs) of the flash memory. The PBAs will then be utilized by the SSD's controller to carry out the received commands.

Recently, SSDs have become more widely used as storage devices as SSDs offer numerous advantages over traditional mechanical hard disk drives. For example, SSDs are much faster than HDDs, and are able to deliver up to 100 times the performance of HDDs and this translates to faster boot times and faster file transfers. SSDs also consume much lesser power than HDDs resulting in improved power and heat efficiencies. As a result, SSDs are now widely used in industrial, medical or military applications.

Typically, most SSDs will be used with a host device and may be used to store the host device's operating system, i.e. used as the host's system drive, whereby code associated with the operating system is stored within the SSD and will be accessed when the host device boots up. When the SSD is used as the host's system drive, the SSD will have a master boot record (MBR) stored at a logical block address (LBA) 0 and the host device's operating system code stored elsewhere in the storage device. When a host device accesses the storage device for the first time, instructions will be sent to LBA 0 to instruct the SSD to send the contents at LBA 0 to the host device. This enables the host device to read the MBR from LBA 0 whereby the MBR will typically contain computer-readable program code that, when executed by the host device, provides the host device with the ability to read the other parts of the operating system code from the storage device and boot up the host device.

Alternatively, an SSD may also be used as a secondary storage medium such as USB flash drives, memory cards or external storage devices to expand the storage capacity accessible by the host device. When such an SSD is accessed for the first time by a host device, the content at LBA 0 of the storage device would indicate to the host device that it is to be used as a secondary storage medium.

In order to access information contained within sensitive applications, malicious third parties have resorted to various means and ways to infect the MBR of such storage devices. A common method involves the malicious third party gaining system level access to the storage device before de-rooting the MBR or other boot sectors of the storage device and causing a compromised operating system to be installed within.

To protect the operating system from being tampered with and to prevent access to important private information if the storage device is misplaced, it has been proposed by those skilled in the art that the operating system code (including the MBR) be encrypted by software installed within the storage device and be subjected to authentication procedures, so that the MBR and operating system code are accessible only to authorized users. As the controller will not be able to read the MBR prior to authenticating a user of the storage device, the storage device can store an "alternate" master boot record (MBR) that causes authentication information to be collected and validated by an authentication program running in the storage device.

After successfully authenticating a user of the storage device, the storage device remaps LBA 0 to the original MBR, so that the storage device can receive the actual MBR and boot up as normal. The downside to this approach is that if the user's authentication credentials are compromised, this means that the MBR and the operating system code will also be jeopardized.

Additionally, solutions proposed by those skilled in the art require the operating system, partition system or boot area of the monitored storage device to be known and pre-loaded into these solutions before the storage device may be adequately protected by these solutions. In other words, existing solutions are unable to automatically identify the operating system, partition system or boot area of the monitored storage device and such information has to be provided by the user to the existing monitoring solution. To the controller of the storage device, all information contained within the storage device comprises the user's data and it is by default unable to differentiate this data. This becomes particularly problematic when the operating system, partition system or boot area of the monitored storage device is modified or incorrectly selected by the user and as a result, the storage device may become inadvertently compromised.

For the above reasons, those skilled in the art are constantly striving to come up with a module and method that is capable of detecting malicious activities in a storage device even though the operating system, partition system or boot area of the storage device is not provided to the controller of the device by a user.

SUMMARY OF THE INVENTION

The above and other problems are solved and an advance in the art is made by systems and methods provided by embodiments in accordance with the invention.

A first advantage of embodiments of modules and methods in accordance with the invention is that the module is able to identify the type of operating system installed within the memory device.

A second advantage of embodiments of modules and methods in accordance with the invention is that the module is able to detect malicious activities taking place within specific locations within the storage device automatically and efficiently.

A third advantage of embodiments of modules and methods in accordance with the invention is that the logical block addresses of the storage device will be monitored at the firmware level and does not require the operating system to be booted up before malicious activities may be detected and thwarted.

A fourth advantage of embodiments of modules and methods in accordance with the invention is that content contained within a storage device (that has configured to act as the host device's system device) will still be protected from malicious third parties even though the storage device is removed from the host device and reconfigured as a secondary storage device as the module as the module is configured detect malicious activities in both configurations.

A fifth advantage of embodiments of modules and methods in accordance with the invention is that the module may not be disabled at the operating system level as the module is implemented as part of the storage device controller's firmware.

The above advantages are provided by embodiments of a method in accordance with the invention operating in the following manner.

According to a first aspect of the invention, a module for detecting malicious activity in a storage device is disclosed, whereby the module is provided within a controller of the storage device, the module being configured to: retrieve a first logical block address (LBA0) sent to the controller from a host device and retrieve content at the first LBA0, whereby the retrieved content is used to prime a trained neural network retrieved from a data module provided within the controller; identify, using content at the first LBA0 and the trained neural network, logical block addresses (LBAs) of the storage device that are to be monitored; mirror instructions sent to the identified LBAs by the host device to the controller, and mirror contents of the mirrored LBAs; determine, using the trained neural network, if malicious activity is occurring at the storage device based on the mirrored instructions and contents, wherein the neural network is trained for different types of operating systems or secondary storage operations based on average read/write/overwrite access of contents at LBAs related to master boot records, master file tables, boot sectors, BIOS parameter blocks or extended BIOS parameter blocks of file systems associated with the operating systems or the secondary storage operations.

With regard to the first aspect of the invention, the priming of the associated trained neural network comprises the module being configured to: select a set of magic numbers from the content at the first LBA0, whereby the selected set of magic numbers are used with a magic number lookup table to determine a type of operating system or a type of secondary storage operation associated with a file system of the storage controller, whereby the magic number lookup table is obtained from the data module; and prime the trained neural network to detect malicious activities related to the determined type of operating system or secondary storage operation from the data module.

With regard to the first aspect of the invention, the identifying LBAs of the storage device that are to be monitored comprises the module being configured to: identify, based on a determined type of operating system or secondary storage operation associated with the primed trained neural network, LBAs that contain critical data whereby the critical data comprises at least a master file table, a master boot record, a boot sector, a BIOS parameter block or an extended BIOS parameter block of a file system associated with the storage device.

With regard to the first aspect of the invention, the module is further configured to: optimize the trained neural network using the malicious activity determined to have occurred at the storage device based on the mirrored instructions and contents.

With regard to the first aspect of the invention, the module is further configured to: lockdown the storage device in response to a determination that malicious activity is determined to have occurred at the storage device based on the mirrored instructions and contents.

With regard to the first aspect of the invention, the trained neural network comprises one of an artificial neural network, a Recurrent Neural Network (RNN) or a Convolutional Neural Network (CNN).

According to a second aspect of the invention, a method for detecting malicious activity in a storage device is disclosed, the method comprising the steps of: retrieving, using a module provided within a controller of the storage device, a first logical block address (LBA0) sent to the controller from a host device; retrieving, using the module, content at the first LBA0, whereby the retrieved content is used to prime a trained neural network retrieved from a data module provided within the controller; identifying using content at the first LBA0 and the trained neural network, using the module, logical block addresses (LBAs) of the storage device that are to be monitored; mirroring, using the module, instructions sent to the identified LBAs by the host device to the controller, and mirror contents of the mirrored LBAs; and determining, using the trained neural network, if malicious activity is occurring at the storage device based on the mirrored instructions and contents, wherein the neural network is trained for different types of operating systems or secondary storage operations based on average read/write/overwrite access of contents at LBAs related to master boot records, master file tables, boot sectors, BIOS parameter blocks or extended BIOS parameter blocks of file systems associated with the operating systems or the secondary storage operations.

With regard to the second aspect of the invention, the priming of the associated trained neural network comprises the steps of: selecting, using the module, a set of magic numbers from the content at the first LBA0, whereby the selected set of magic numbers are used with a magic number lookup table to determine a type of operating system or a type of secondary storage operation associated with a file system of the storage controller, whereby the magic number lookup table is obtained from the data module; and priming, using the module, the trained neural network to detect malicious activities related to the determined type of operating system or secondary storage operation from the data module.

With regard to the second aspect of the invention, the identifying LBAs of the storage device that are to be monitored comprises the steps of: identifying, using the module, based on a determined type of operating system or secondary storage operation associated with the primed trained neural network, LBAs that contain critical data whereby the critical data comprises at least a master file table, a master boot record, a boot sector, a BIOS parameter block or an extended BIOS parameter block of a file system associated with the storage device.

With regard to the second aspect of the invention, the method further comprises the step of: optimizing, using the module, the trained neural network using the malicious activity determined to have occurred at the storage device based on the mirrored instructions and contents.

With regard to the second aspect of the invention, the method further comprises the step of: locking down, using the module, the storage device in response to a determination that malicious activity is determined to have occurred at the storage device based on the mirrored instructions and contents.

With regard to the second aspect of the invention, the trained neural network comprises one of an artificial neural network, a Recurrent Neural Network (RNN) or a Convolutional Neural Network (CNN).

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a module and method for detecting malicious activities in a storage device whereby the module is provided within a controller of the storage device. The module is configured to monitor, using a trained neural network, appropriate logical block addresses (LBAs) of the file system of the storage device that contain sensitive data or information for malicious activities wherein the neural network is trained for different types of operating systems or secondary storage operations based on average read/write/overwrite access of contents at LBAs related to master boot records, master file tables, boot sectors, BIOS parameter blocks or extended BIOS parameter blocks of file systems associated with the operating systems or the secondary storage operations.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions, firmware or executable code that may instruct a computer processor to carry out a sequence of events based on instructions received. The choice of the implementation of the modules is left as a design choice to a person skilled in the art and does not limit the scope of this invention in any way.

An exemplary process or method for detecting malicious activity in a storage device in accordance with embodiments of the invention is set out in the steps below. The steps of the process or method as implemented by a module provided within a controller of the storage device are as follows:

Step 1: retrieve a first logical block address (LBA0) sent to the controller from a host device and retrieve content at the first LBA0, whereby the retrieved content is used to prime a trained neural network retrieved from a data module provided within the controller;

Step 2: identify, using content at the first LBA0 and the trained neural network, logical block addresses (LBAs) of the storage device that are to be monitored;

Step 3: mirror instructions sent to the identified LBAs by the host device to the controller, and mirror contents of the mirrored LBAs;

Step 4: determine, using the trained neural network, if malicious activity is occurring at the storage device based on the mirrored instructions and contents, wherein the neural network is trained for different types of operating systems or secondary storage operations based on average read/write/overwrite access of contents at LBAs related to master boot records, master file tables, boot sectors, BIOS parameter blocks or extended BIOS parameter blocks of file systems associated with the operating systems or the secondary storage operations.

Figure 1:
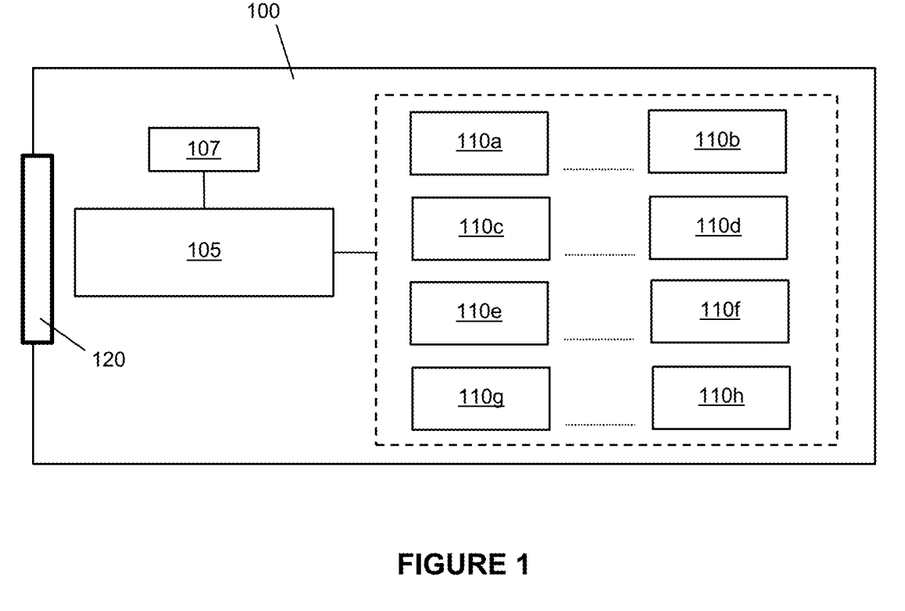
FIG. 1 illustrating a block diagram of modules contained within a storage device in accordance with embodiments of the invention.

In accordance with embodiments of the invention, the steps set out above may be carried out or executed by modules contained within controller 105 of storage device 100, as illustrated in FIG. 1, whereby storage device 100 additionally comprises cache 107, flash memories 110a-h and interface 120. Storage device 100 may comprise various types of solid state devices/drives, cache 107 may comprise a dynamic Random-Access-Memory (DRAM) and is used for caching both user data and internal SSD meta data. Flash memories 110a-h may comprise any type of electronic non-volatile computer memory storage medium that can be electronically erased and reprogrammed such as NAND or NOR flash memories. Interface 120 acts as the physical interface between a host system and storage device 100 whereby existing storage standards and interfaces such as, but not limited to, small computer system interface (SCSI) protocol, serial advanced technology attachment (SATA) protocol, serial attached SCSI (SAS), Non-Volatile Memory express (NVMe), Peripheral Component Interconnect express (PCIe) or any similar interface may be used as the link for communicatively connecting storage device 100 to a host device such as a computer.

Controller 105 is a complex embedded system with standalone processing and works with firmware and modules contained within controller 105 to manage all aspects of storage device 100, including protecting and controlling content stored in flash memories 110a-h. This controller is most commonly implemented as a SoC (System-On-Chip) design which consists of multiple hardware-accelerated functional blocks/modules that are coupled to one or more embedded processor cores.

Figure 2:
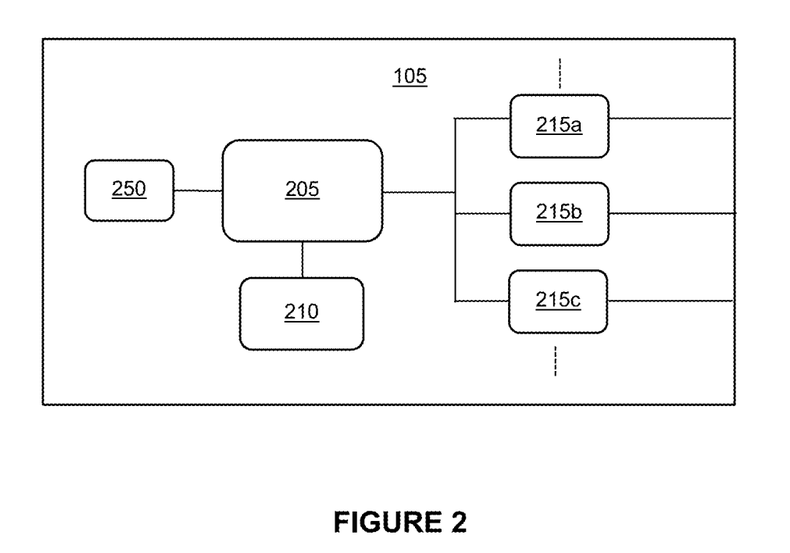
FIG. 2 illustrating a block diagram of modules contained within a controller of a storage device in accordance with embodiments of the invention.

The functional blocks contained within controller 105 are illustrated in FIG. 2. In particular, FIG. 2 shows that controller 105 may comprise micro-controller 205, buffer 210, flash interface modules (FIMs) 215a-c, and threat detection module 250. Micro-controller 205 comprises a processor located inside controller 105 and is tasked to receive and manipulate incoming data. Herein the term "processor" is used to refer generically to any device or component that can process such instructions and may include: a microprocessor, microcontroller, programmable logic device or other computational device. That is, micro-controller 205 may be provided by any suitable logic circuitry for receiving inputs, processing them in accordance with instructions stored in memory and generating outputs. In this embodiment, micro-controller 205 may be a single core processor with memory addressable space. Buffer 210 may be treated as a data module as it may comprise SRAM (static RAM) for executing controller 105's firmware or storing data/information that is to be accessed by module 250. Threat detection module 250 is used to mirror inputs/outputs at controller 105; train and load an appropriate trained neural network to detect malicious activities that may take place within the storage device and related tasks in accordance with embodiments of the invention. FIMs 215a-c act as the physical and logical interconnects between controller 105 and the flash memories 110a-h allowing the controller to communicate with multiple flash memories simultaneously. One skilled in the art will recognize that the various memory components described above comprise non-transitory computer-readable media and shall be taken to comprise all computer-readable media except for a transitory, propagating signal. Typically, the instructions are stored as program code in the memory components but can also be hardwired. Although not shown, controller 105 also comprises a flash translation layer (FTL) for translating LBAs from a host device to physical block addresses (PBAs) of the flash memories. The detailed workings of the FTL are omitted for brevity as it is known to those skilled in the art.

When a host device (not shown) is booted up and under the assumption that storage device 100 is to be used as the host device's system device, its operating system would not be contained within the host device's ROM or RAM. It would be stored within storage device 100. As such, to facilitate the loading of the operating system, the host device will execute a firmware stored in the host device's ROM which will send appropriate instructions to LBA '0' (LBA0) of storage device 100. Upon receiving these instructions which are addressed to its LBA '0", storage device 100 will send back data that is stored at a physical block address that corresponds to LBA '0'. Behind the scenes, the logical block address received by controller 105 of storage device 100 will be converted into a suitable physical block address by the FTL provided within controller 105. However, to the host device, all this is unseen and it is understood that when instructions are addressed to LBAs of storage device 100, all the necessary translations between the LBAs to PBAs will automatically take place in controller 105.

Typically in a system device, the first LBA in the LBA scheme, i.e. LBA '0', may contain, but is not only limited to, the master boot record (MBR), which comprises computer-readable program code that, when executed by the host device, provides the host device with the ability to read the other parts of the operating system code from the storage device 100 and boot up the host device. LBA is a common scheme that is used for specifying the location of blocks of data stored within storage device 100 and provides a simple linear addressing method for the host device to access content stored within storage device 100 without the host device having to be aware of the storage device's physical sector positions or PBAs. As such, when various partitions, file systems or any other special areas of the storage device are accessed by the host device, the LBAs associated with these areas will be sent by the host device to controller 105 of storage device 100 so that controller 105 may use this information to retrieve the relevant data/information for the host device.

As controller 105 receives the LBAs and their related instructions from the host device and returns the contents of the LBAs to the host device based on the received instructions, threat detection module 250 is configured to mirror all this and this may be done by making a record of all inputs and outputs taking place at controller 105. In other words, threat detection module 250 may achieve this by recording the instructions received by controller 105 and the LBAs that the instructions are directed to. Data and/or information provided at these LBAs may then be recorded by module 250 as well before the data and/or information is sent back to the requesting host device.

Figure 3:
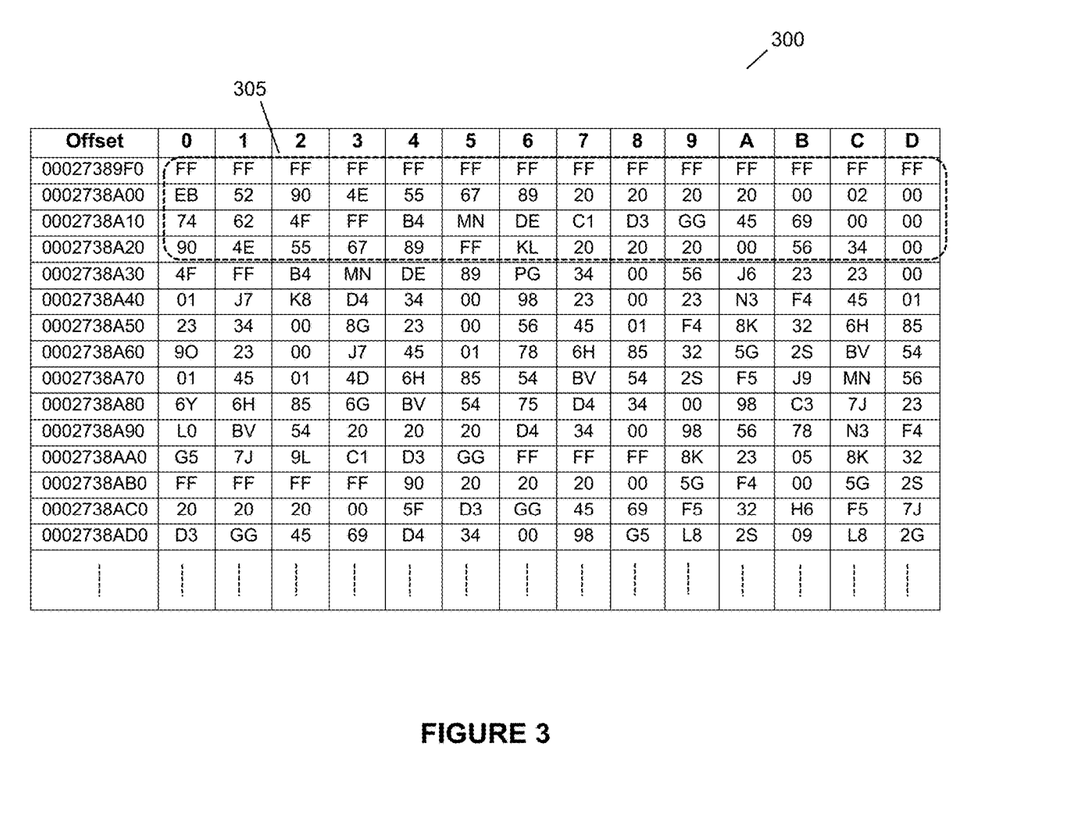
FIG. 3 illustrating an exemplary boot sector of a file system in a storage device in accordance with embodiments of the invention.

An exemplary boot sector of a file system as provided at logical block address '0' (LBA0) is shown in FIG. 3. As illustrated, it is shown that boot sector 300 comprises multiple fields having multiple lengths and their individual offsets. Each field would have its own typical value which would be associated with a particular meaning or command. These values may comprise, but are not limited to, hex numbers or magic numbers that have been generated based on each particular meaning/command for each type of operating system/file system/storage system and as such, each meaning or command would be associated with a unique value. For example, a value of "EB" may be associated with "Bytes per sector", a value of "52" may be associated with "Sectors per Cluster", a value of "67" may be associated with "OEM ID", a value of "J9" may be associated with "BPB", a value of "34" may be associated with "extended BPB" and etc.

In this exemplary embodiment of the invention, of particular interest would be key information contained at data 305 of LBA0 as shown in FIG. 3, e.g. may comprise the BIOS parameter block (BPB) and the extended BPB, and one skilled in the art will recognize that this is just an example and that other contents at LBA0 may be used as well. Based on the information contained in data 305, the following information about the file system of the storage device may be determined: number of bytes per sector, number of sectors per cluster, the type of media descriptor, the total number of sectors, the location of the master file table (MFT) or its equivalent structure, the location of the copy of the master file table, the number of clusters per MFT record, the number of clusters per index buffer, the type of file system, the operating system and the volume's serial number. This information may then be used to determine the operating system of the storage device's file system, the storage device's file system and/or the operation of the storage device's file system. One skilled in the art will recognize that other information may be included within data 305 and within the content of LBA without departing from the invention.

In accordance embodiments of the invention, a magic number lookup table may be preloaded into cache 107 or buffer 210. As known to one skilled in the art, magic numbers refer to constant numerical values that were generated for specific information or data. As such, these magic numbers may be used to identify a particular file format or protocol or may refer to distinctive unique values that are unlikely to be mistaken for other meanings. In this embodiment of the invention, each of the magic numbers in the preloaded magic number lookup table refers to a particular type of operating system and/or a type of file system such as a secondary storage file system. It should be noted that this lookup table may be updated periodically as required, or whenever a new operating system, secondary storage file system, or other types of file systems are introduced. The information in the magic number lookup table may then be matched with the contents found at LBA0 and based on the resulting match, module 250 may then determine the type of operating system/file system/storage system that is associated with the storage device.

By doing so, threat detection module 250 may then utilize this information to prime a trained neural network contained within module 250 to detect malicious activities for a specific type of operating system or secondary storage operation as each file system would have its own unique list of LBAs that contain critical content, information or data. In embodiments of the invention, critical content or records comprises, but is not limited to, data that affects the user of the storage device, data that affects the normal operation of the storage device and/or any such similar data. In otherwords, this information may be used by module 250 to identify LBAs in the file system of storage device 100 that are to be closely monitored by the trained neural network whereby these LBAs may be unique to the type of file system installed within the storage device. Additionally, a trained neural network that has been optimized for the identified type of operating system or file system may also be selected and loaded. Once the parameters described above have been initialized, the primed trained neural network may then be used by module 250 to monitor storage device 100 for malicious activities.

In embodiment's of the invention, a neural network model is provided within buffer 210 or cache 107 and this neural network may comprise, but is not limited to, an artificial neural network such as a recurrent neural network (RNN), a recursive neural network or a convolutional neural network (CNN). This neural network model would have been pretrained before it is used to detect malicious activities taking place in a file system of a storage device.

In particular, the neural network model would have been trained based on average read/write/overwrite access of contents at specific LBAs or PBAs relating to master boot records, master file tables, boot sectors, BIOS parameter blocks and/or extended BIOS parameter blocks of file systems associated with each type of operating system or the secondary storage file systems (which are installed in storage devices used as secondary storage operations).

In other words, the neural network model would have been trained based on various input vectors such as the average read/write/overwrite access of contents of LBAs that are commonly accessed during the operation of various types of operating systems and their corresponding file systems or during the operation of the storage device as a secondary storage system. As such, any activities that deviate from these conventional actions may cause the neural network to label the triggering activities as malicious activities. Labelled malicious activities together with LBAs accessed by these malicious activities may also be used to train the neural network whereby combinations of the data above may be provided to the neural network during its training phase to optimize the training of the neural network.

In further embodiments of the invention, the trained neural network may be further optimized using malicious activities detected during the normal operation of the storage device. Such an on-the-fly optimization step would greatly improve the efficiency and effectiveness of the neural network.

In embodiments of the invention, the average read/write/overwrite access of contents of the LBAs of the various operating systems and file systems may be obtained by recording the inputs/outputs at the controller of a storage device having the various operating systems and file systems over a period of time. The average read/write/overwrite access may also be obtained from third parties resources and may be used train the neural network.

Additionally, as the LBAs accessed for each of the various operating systems, file systems and secondary storage systems differ from one system to the next, a record of the LBAs that contain critical data for each of these systems may be created whereby the critical data may comprise, but is not limited to, a master file table or its equivalent file structure, a master boot record, a boot sector, critical areas defined by an user, a secure area, a BIOS parameter block or an extended BIOS parameter block of a file system. This record may then be linked with the trained neural network model and be stored in cache 107 or buffer 210 or alternatively, may be used as part of the training data provided to train the neural network as described above. Hence, once a storage device's function has been identified, i.e. to operate as a system device or secondary storage device, the LBAs of the storage device that contain critical data may then be identified from this record.

In summary, the neural network will be trained to protect certain areas of the file system and the training will be done based on the type of file system that is implemented on the storage device and LBAs that contain critical data. The information to identify the type of file system may be obtained from contents at the first LBA, i.e. LBA0. However, one skilled in the art will recognize that while the relevant content may initially be found at LBA0, for certain types of file systems, it may be so voluminous or due to the manner in which the information is structured, it may be distributed across multiple LBAs, e.g. from LBA "0"-LBA "48". In embodiments of the invention, each neural network may be optimized for each type of file system as the critical LBAs vary from one file system to the next. As such, the type of trained neural network that is to be used may depend on the file system of the storage device and the performance of trained neural network may be more efficient and effective if a suitably trained neural network were to be selected to be used with the suitable file system and this action may be taken as the priming of the trained neural network.

Figure 4:
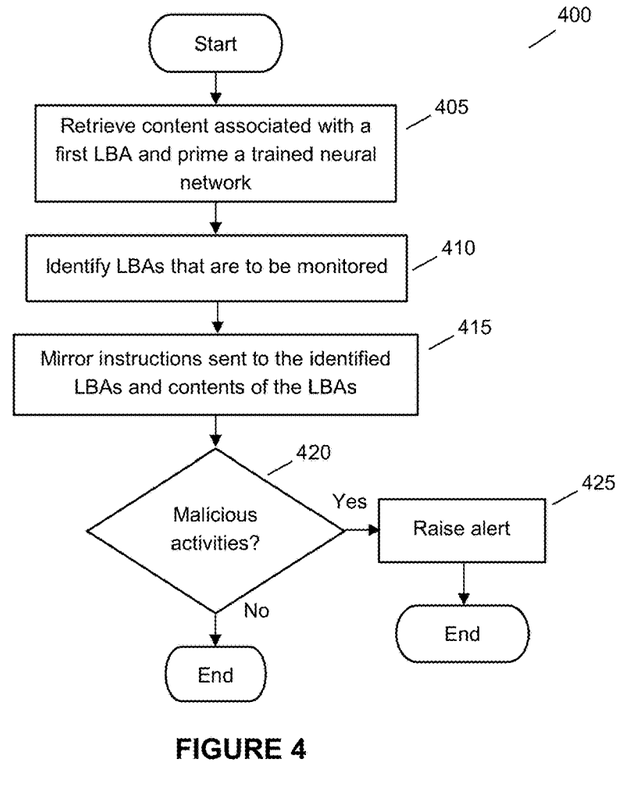
FIG. 4 illustrating a flow chart of a process or a method for detecting malicious activity in a storage device in accordance with embodiments of the invention.

FIG. 4 illustrates process 400 for detecting malicious activities in a storage device that is communicatively connected to a host device in accordance with embodiments of the invention whereby process 400 may be implemented in threat detection module 250 as provided within a controller of a storage device. Process 400 begins at step 405 whereby a first logical block address (LBA) sent to the controller from the host device is copied by process 400. Process 400 then proceeds to retrieve content at the first LBA, whereby the retrieved content is used to prime a trained neural network retrieved from a data module provided within the controller. When this happens, a specific neural network that has been optimized for the identified file system/operation system/storage system is loaded and primed.

Based on the retrieved content and/or the primed trained neural network, a record of the LBAs that contain critical data for an associated file system is then loaded at step 410. This record is then used to identify LBAs of the storage device that are to be monitored by process 400. At step 415, process 400 then mirrors instructions sent to the LBAs under monitor and also mirrors contents from these LBAs that are subsequently sent to the host device. Process 400 then determines at step 420, based on the mirrored instructions and contents if malicious activities are taking place at the storage device.

If the process 400 determines at step 420 that malicious activities are taking place within the storage device, process 400 will then proceed to step 425 whereby a suitable alarm or warning will be raised or alternatively the storage device may be locked down. Process 400 then ends. Conversely, if no malicious activities are detected by process 400 at step 420, process 400 will then end. Process 400 will then repeat itself each time the storage device is booted up or started up so that it would be able to detect any malicious activities that may take place.

Figure 5:
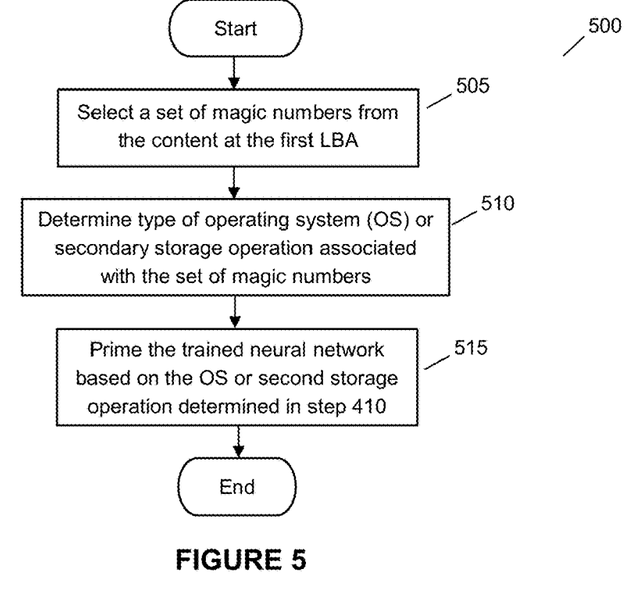
FIG. 5 illustrating a flow chart of a process or a method for priming a trained neural network in accordance with embodiments of the invention.

FIG. 5 illustrates process 500 that may be implemented in module 250 for priming a trained neural network retrieved from a data module during the boot up or start-up of the associated host device. Process 500 begins at step 505 by selecting a set of values or magic numbers from the content found at the first LBA (as copied by process 400 in step 405) or at other LBAs if the content extends beyond the first LBA. These set of values or magic numbers are then compared with a magic number lookup table that was preloaded into a cache or buffer of the storage device. By matching the set of values/magic numbers with that contained in the magic number lookup table, process 500 is then able to determine at step 510 the type of operating system and its file system or be able to determine the type of system configuration (e.g. secondary storage file system) associated with the file system of the storage device. LBAs that are critical to the identified file system are also identified at this step so that the trained neural network will be made aware that it has to monitor these LBAs. Process 500 then proceeds to prime the trained neural network based on this information at step 515 thereby accelerating the detection speed of the trained neural network as it would have been primed to be used with the appropriate file system.

Numerous other changes, substitutions, variations and modifications may be ascertained by the skilled in the art and it is intended that the present invention encompass all such changes, substitutions, variations and modifications as falling within the scope of the appended claims.

The invention claimed is:

1. A module for detecting malicious activity in a storage device, whereby the module is provided within a controller of the storage device, the module being configured to:

retrieve a first logical block address (LBA0) sent to the controller from a host device and retrieve content at the first LBA0, whereby the retrieved content is used to prime a trained neural network retrieved from a data module provided within the controller;

identify, using content at the first LBA0 and the trained neural network, logical block addresses (LBAs) of the storage device that are to be monitored;

mirror instructions sent to the identified LBAs by the host device to the controller, and mirror contents of the mirrored LBAs;

determine, using the trained neural network, if malicious activity is occurring at the storage device based on the mirrored instructions and contents, wherein the neural network is trained for different types of operating systems or secondary storage operations based on average read/write/overwrite access of contents at LBAs related to master boot records, critical records, master file tables, boot sectors, BIOS parameter blocks or extended BIOS parameter blocks of file systems associated with the operating systems or the secondary storage operations.

2. The module according to claim 1 wherein the priming of the trained neural network comprises the module being configured to:

select a set of magic numbers from the content at the first LBA0, whereby the selected set of magic numbers are used with a magic number lookup table to determine a type of operating system or a type of secondary storage operation associated with a file system of the controller, whereby the magic number lookup table is obtained from the data module; and prime the trained neural network to detect malicious activities related to the determined type of operating system or secondary storage operation.

3. The module according to claim 2 wherein the priming the trained neural network comprises the module being configured to select a trained neural network that has been optimized for the determined type of operating system or the determined type of secondary storage operation associated with the file system of the controller.

4. The module according to claim 1 wherein the identifying LBAs of the storage device that are to be monitored comprises the module being configured to:

identify, based on a determined type of operating system or secondary storage operation associated with the primed trained neural network, LBAs that contain critical data whereby the critical data comprises at least a master file table, a master boot record, a boot sector, a BIOS parameter block or an extended BIOS parameter block of a file system associated with the storage device.

5. The module according to claim 1 wherein the module is further configured to:

optimize the trained neural network using the malicious activity determined to have occurred at the storage device based on the mirrored instructions and contents.

6. The module according to claim 1 wherein the module is further configured to:

lockdown the storage device in response to a determination that malicious activity is determined to have occurred at the storage device based on the mirrored instructions and contents.

7. The module according to claim 5 wherein the module is further configured to:

lockdown the storage device in response to a determination that malicious activity is determined to have occurred at the storage device based on the mirrored instructions and contents.

8. The module according to claim 1 wherein the trained neural network comprises an artificial neural network.

9. The module according to claim 8 wherein the artificial neural network comprises a Recurrent Neural Network (RNN) or a Convolutional Neural Network (CNN).

10. A method for detecting malicious activity in a storage device comprising the steps of:
retrieving, using a module provided within a controller of the storage device, a first logical block address (LBA0) sent to the controller from a host device;
retrieving, using the module, content at the first LBA0, whereby the retrieved content is used to prime a trained neural network retrieved from a data module provided within the controller;
identifying using content at the first LBA0 and the trained neural network, using the module, logical block addresses (LBAs) of the storage device that are to be monitored;
mirroring, using the module, instructions sent to the identified LBAs by the host device to the controller, and mirror contents of the mirrored LBAs; and
determining, using the trained neural network, if malicious activity is occurring at the storage device based on the mirrored instructions and contents, wherein the neural network is trained for different types of operating systems or secondary storage operations based on average read/write/overwrite access of contents at LBAs related to master boot records, critical records, master file tables, boot sectors, BIOS parameter blocks or extended BIOS parameter blocks of file systems associated with the operating systems or the secondary storage operations.

11. The method according to claim 10 wherein the priming of the trained neural network comprises the steps of:
selecting, using the module, a set of magic numbers from the content at the first LBAO, whereby the selected set of magic numbers are used with a magic number lookup table to determine a type of operating system or a type of secondary storage operation associated with a file system of the controller, whereby the magic number lookup table is obtained from the data module; and
priming, using the module, the trained neural network to detect malicious activities related to the determined type of operating system or secondary storage operation.

12. The method according to claim 11 wherein the priming the trained neural network comprises the step of selecting a trained neural network that has been optimized for the determined type of operating system or the determined type of secondary storage operation associated with the file system of the controller.

13. The method according to claim 10 wherein the identifying LBAs of the storage device that are to be monitored comprises the steps of:
identifying, using the module, based on a determined type of operating system or secondary storage operation associated with the primed trained neural network, LBAs that contain critical data whereby the critical data comprises at least a master file table, a master boot record, a boot sector, a BIOS parameter block or an extended BIOS parameter block of a file system associated with the storage device.

14. The method according to claim 10 wherein the method further comprises the step of:
optimizing, using the module, the trained neural network using the malicious activity determined to have occurred at the storage device based on the mirrored instructions and contents.

15. The method according to claim 10 wherein the method further comprises the step of:
locking down, using the module, the storage device in response to a determination that malicious activity is determined to have occurred at the storage device based on the mirrored instructions and contents.

16. The method according to claim 14 wherein the method further comprises the step of:
locking down, using the module, the storage device in response to a determination that malicious activity is determined to have occurred at the storage device based on the mirrored instructions and contents.

17. The method according to claim 10 wherein the trained neural network comprises an artificial neural network.

18. The method according to claim 17 wherein the artificial neural network comprises a Recurrent Neural Network (RNN) or a Convolutional Neural Network (CNN).

* * * * *